United States Patent [19]

Sakamoto et al.

[11] Patent Number: 5,267,022

[45] Date of Patent: Nov. 30, 1993

[54] VIDEO SIGNAL PROCESSING APPARATUS FOR VIDEOTAPE RECORDER/REPRODUCER CAPABLE OF EFFECTING VERTICAL (AND HORIZONTAL) EMPHASIS AND DEEMPHASIS ON CHROMINANCE SIGNALS

[75] Inventors: Etsurou Sakamoto; Masatoshi Takashima, both of Kanagawa, Japan

[73] Assignee: Sony Corporation, Tokyo, Japan

[21] Appl. No.: 789,753

[22] Filed: Nov. 8, 1991

[30] Foreign Application Priority Data

Nov. 15, 1990 [JP] Japan .................. 2-309078

[51] Int. Cl.⁵ .................. H04N 11/06; H04N 7/04; H04N 5/213
[52] U.S. Cl. .................. 358/12; 358/141; 358/107
[58] Field of Search .................. 358/30, 36, 12, 11, 358/37, 166, 167, 315, 316, 327, 140, 141

[56] References Cited

U.S. PATENT DOCUMENTS

| | | | |
|---|---|---|---|
| 4,607,285 | 8/1986 | Hirota et al. | 358/167 |
| 4,612,585 | 9/1986 | Takase et al. | 358/316 |
| 4,618,893 | 10/1986 | Hirota et al. | 358/167 |
| 4,626,927 | 12/1986 | Hirota et al. | 358/310 |
| 4,658,305 | 4/1987 | Tsushima | 358/327 |
| 4,668,988 | 5/1987 | Sasaki et al. | 358/315 |
| 4,908,697 | 3/1990 | Tsinberg et al. | 358/141 |
| 5,079,632 | 1/1992 | Kawai et al. | 358/12 |
| 5,126,846 | 6/1992 | Niimura | 358/167 |

FOREIGN PATENT DOCUMENTS 0287316 10/1988 European Pat. Off.

OTHER PUBLICATIONS

IEEE Transactions on Consumer Electronics vol. CE-26, Aug. 1980, New York US pp. 323-330 Kobayashi et al., 'Color signal processing with new bandwidth compression technique for a VCR' p. 328, right col., line 1-line 14; figure 9.

*Primary Examiner*—John K. Peng
*Assistant Examiner*—John W. Miller
*Attorney, Agent, or Firm*—William S. Frommer; Alvin Sinderbrand

[57] ABSTRACT

A video signal processing apparatus, typically for use as a video tape recorder/reproducer for recording and reproducing high-definition television signals, includes an encoder for converting a chrominance signal into a line sequential signal, time-compressing the line sequential signal and multiplexing the time-compressed line sequential signal with a luminance signal according to time-division multiplexing, thereby producing a time-division-multiplexed signal. A vertical emphasis circuit is connected to an input terminal of the encoder, for performing vertical nonlinear emphasis on the chrominance signal. The video signal processing apparatus also includes a vertical low-pass filter for preventing aliasing distortions from the chrominance signal due to the conversion of the chrominance signal into the line sequential signal. The vertical nonlinear emphasis is performed on the chrominance signal after the chrominance signal has been processed by the vertical low-pass filter.

8 Claims, 17 Drawing Sheets

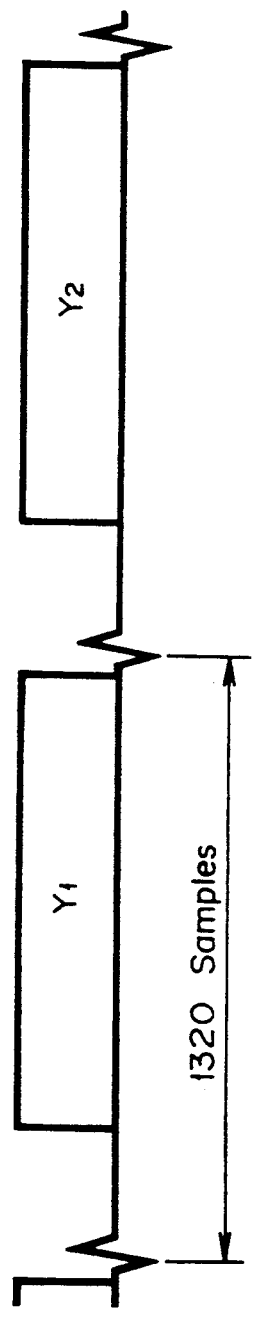
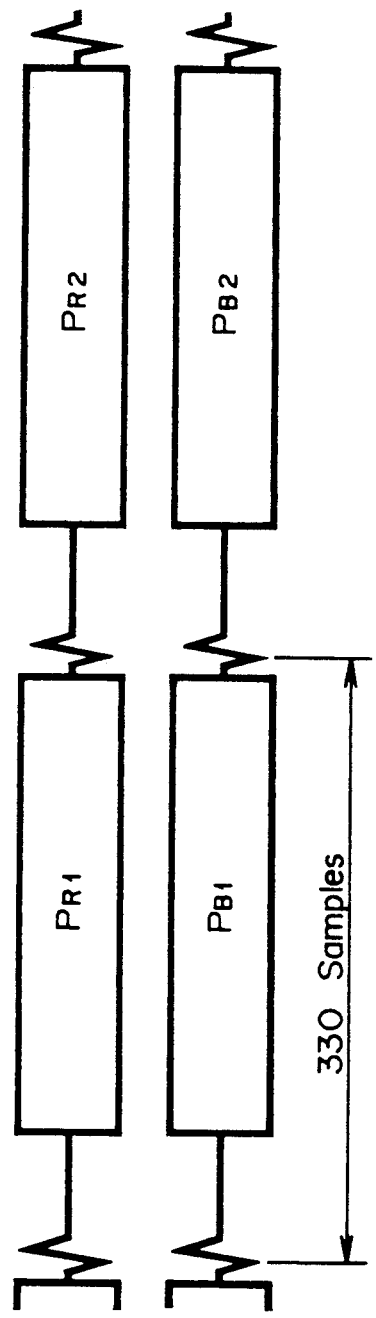
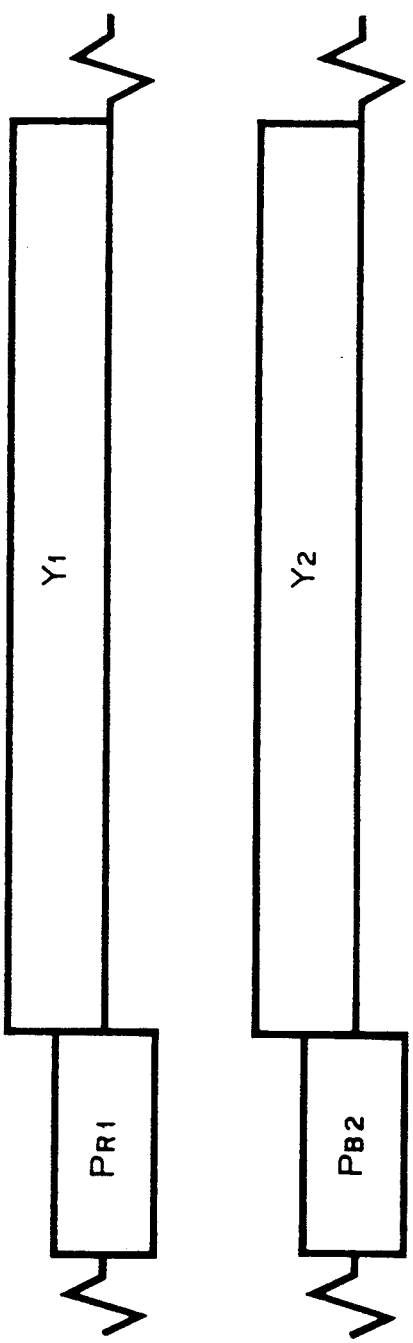
FIG. 2A (PRIOR ART)
FIG. 2B (PRIOR ART)
FIG. 2C (PRIOR ART)
FIG. 2D (PRIOR ART) Channel A
FIG. 2E (PRIOR ART) Channel B

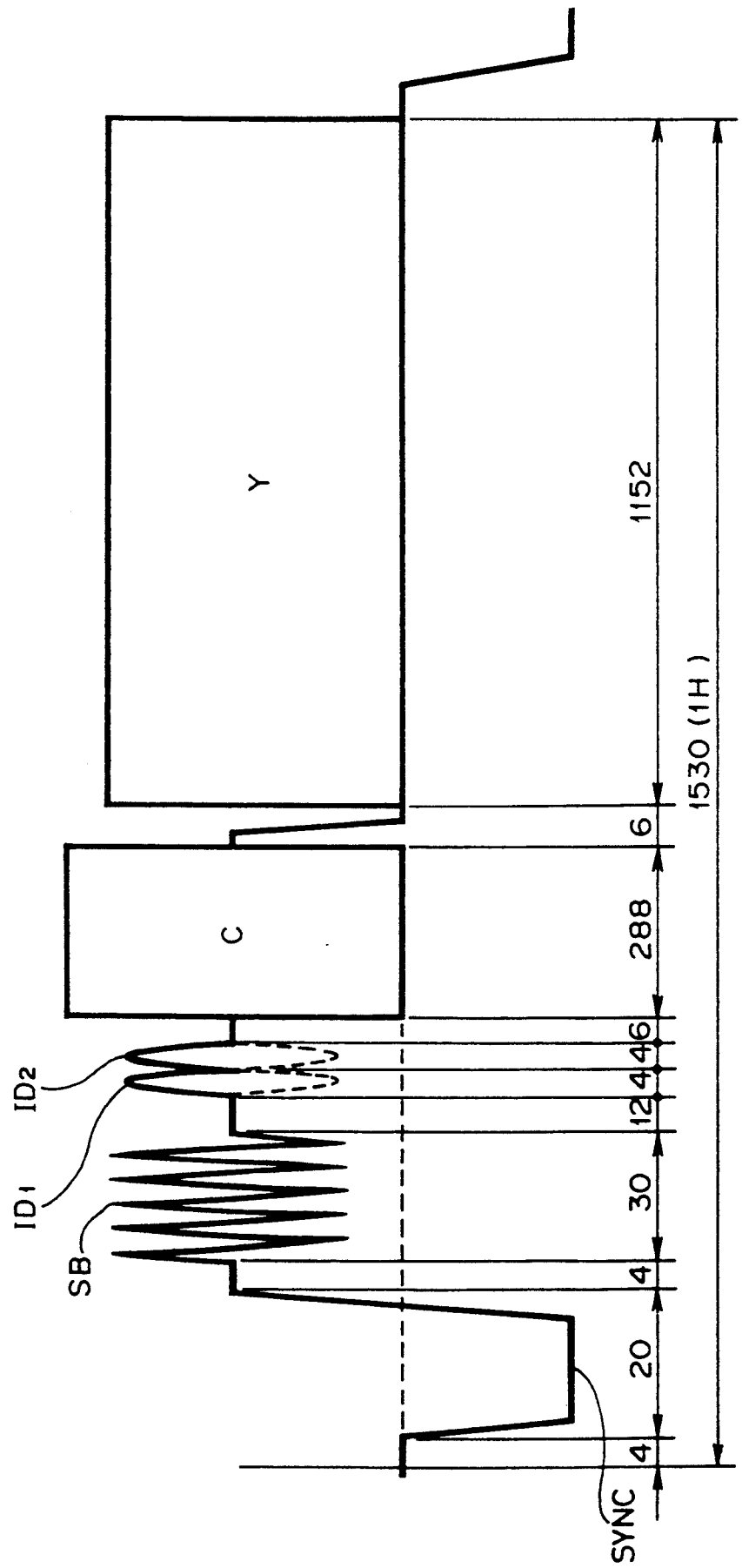

FIG. 9
(PRIOR ART)
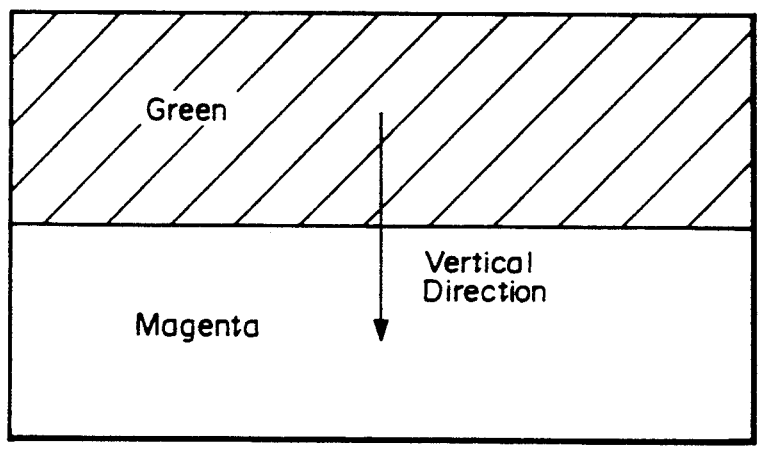
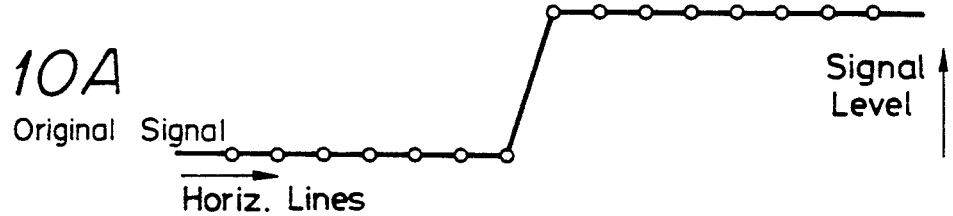
FIG. 10A Original Signal
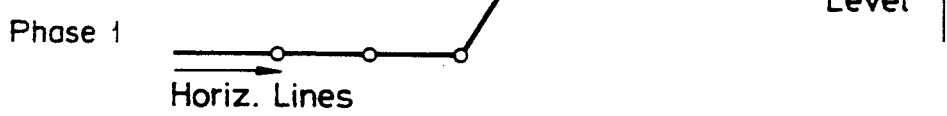
FIG. 10B Phase 1
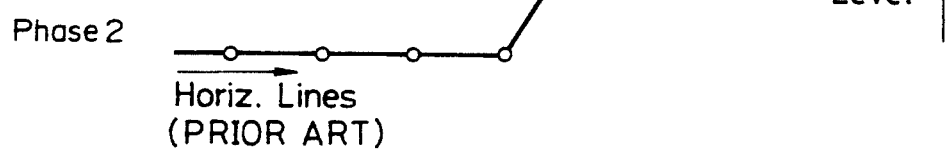
FIG. 10C Phase 2
(PRIOR ART)

VIDEO SIGNAL PROCESSING APPARATUS FOR VIDEOTAPE RECORDER/REPRODUCER CAPABLE OF EFFECTING VERTICAL (AND HORIZONTAL) EMPHASIS AND DEEMPHASIS ON CHROMINANCE SIGNALS

BACKGROUND OF THE INVENTION

1. Field of the Invention:

The present invention relates to a video signal processing apparatus for use in a video tape recorder/reproducer which records and reproduces a high-definition television (HDTV) signal, for example.

2. Description of the Prior Art:

Some video tape recorder/reproducers for recording and reproducing HDTV signals, particularly those for home use, convert chrominance signals into line sequential signals, time-compress the line sequential signals and multiplex the time-compressed line sequential signals with a luminance signal according to time-division multiplexing, thereby producing a TDM signal that is recorded or reproduced in a plurality of channels with multichannel heads (see Japanese Laid-Open Patent Publication No. 63-194494, for example).

FIG. 1 of the accompanying drawings shows one such conventional video tape recorder/reproducer.

In FIG. 1, a luminance signal Y, which is demodulated from an HDTV signal, for example, is applied to an input terminal 1Y and supplied through a low-pass filter 2Y to an analog-to-digital (A/D) converter 3Y. The converted digital signal is then supplied to a TDM encoder 4. Chromatic signals PR, PB (color difference signals R-Y, BY), which are demodulated from the HDTV signal, are applied to respective input terminals 1R, 1B and supplied through respective low-pass filters 2R, 2B to analog-to-digital (A/D) converters 3R, 3B, respectively. The converted digital signals are then supplied to the TDM encoder 4.

The TDM encoder 4 converts the chrominance signals into line sequential signals, and multiplexes them with the luminance signal according to time-division multiplexing.

More specifically, when an HDTV signal is to be recorded, the luminance signal Y and the chrominance signals PR, PB are converted into digital signals at given sampling frequencies by the A/D converters 3Y, 3R, 3B, respectively, as shown in FIGS. 2A, 2B, 2C, and the digital signals are stored in the TDM encoder 4.

The sampling frequency for the luminance signal Y is selected to be an integral ratio, which is to be as simple as possible, of 74.25 MHz, which is a fundamental clock frequency of the HDTV system, and also to be an integral multiple of a horizontal frequency (fH1=33.75 kHz) of the HDTV system. For example, the sampling frequency for the luminance signal Y is selected to be:

$$(3/5) \times 74.25 = 44.55 \text{ (MHz)} = 1320 \text{ fH1}.$$

The sampling frequency for the chrominance signals PR, PB is selected to be ¼ of the sampling frequency for the luminance signal Y.

As shown in FIGS. 2A, 2B, 2C, the luminance signal Y and the chrominance signals PR, PB, which are sampled as 1320 and 330 samples over one horizontal scanning line, are stored in the TDM encoders 4. The stored signals are combined with each other, and the combined signals are supplied to digital-to-analog (D/A) converters 5A, 5B (FIG. 1) which convert them into two-channel TDM signals as shown in FIGS. 2D, 2E. Each channel carries signals for alternative scanning lines.

FIG. 3 shows such a TDM signal for a scanning line in specific detail. As shown in FIG. 3, the TDM signal includes a signal of 1152 samples, which make up an effective screen image of the luminance signal Y, and a signal of 288 samples, which make up an effective screen image of each of the chrominance signals PR, PB, as a selectively omitted line sequential signal. The TDM signal is composed of a total of 1530 samples over one scanning line, and includes, in addition to the luminance signal Y and the chrominance signals PR, PB, a synchronizing signal SYNC of 20 samples, a burst signal SB of 30 samples, and ID data ID1, ID2 each of 4 samples.

The two-channel TDM signals from the D/A converters 5A, 5B are then supplied through respective low-pass filters 6A, 6B to analog signal processors 7A, 7B for preemphasis, for example. The processed signals are supplied from the analog signal processors 7A, 7B to frequency modulators (FM) 8A, 8B, respectively, by which they are converted into respective frequency-modulated signals to be recorded. These converted TDM signals, i.e., the frequency-modulated signals, are then supplied to respective adders 9A, 9B.

Stereophonic audio signals, for example, in righthand and lefthand channels are applied through respective input terminals 10L, 10R to a digital audio signal processor 11 which generates two-channel digital audio signals. These digital audio signals are supplied to the adders 9A, 9B by which they are added to the TDM signals from the frequency modulators 8A, 8B on time-division multiplexing.

The multiplexed signals are then supplied to recording amplifiers 12A, 12B, respectively, which then supply amplified signals through recording/reproducing mode selector switches 13A, 13B to two-channel magnetic heads 14AB, 15AB, respectively, which are mounted on a rotary drum D at a 180°-spaced angular interval.

In a recording mode, the magnetic heads 14AB, 15AB rotate at a speed of 60 revolutions per second, for example, to record, on a magnetic tape T wound around the rotary drum D along a 180° arc, the signals according to a recording pattern (see FIG. 4) with one HDTV frame composed of two channels in four segments (eight tracks) per two revolutions of the rotary drum D. At the same time, the multiplexed digital audio signals are also recorded on the magnetic tape T.

More specifically, as shown in FIG. 4, an overlap of 4° is provided on each end of each of the tracks, and a 180° angular interval between the opposite overlaps on each track comprises a recording area for 167.5 horizontal periods each corresponding to one horizontal scanning line of the TDM signal. 27 out of these 167.5 horizontal periods, counting from the starting end in the head scanning direction, serve as a recording area for the digital audio signals, and the following 140.5 horizontal periods serve as a recording area for the TDM signal.

According to the HDTV format, a maximum of four channels are reserved for the recording of audio signals, and sets of two channels of these four channels may be used independently of each other. The recording area for the digital audio signals includes a recording area for first and second audio signals, and a recording area for third and fourth audio signals. More specifically, one horizontal period, counting from the starting end in the head scanning direction, is reserved as a margin for head switching, and followed by 9.1 horizontal periods reserved as the recording area for the third and fourth audio signals, including a preamble and a postamble. The recording area for the third and fourth audio signals is followed by 1.7 horizontal periods reversed as a guard for after recording, which guard is in turn followed by 9.1 horizontal periods reserved as the recording area for the first and second audio signals. The recording area for the digital audio signals also includes 2.7 horizontal periods reserved as a recording area for an index signal with a guard of 1.7 horizontal periods interposed between the recording area for the index signal and the recording area for the first and second audio signals. The index signal recording area is followed by a guard of 1.7 horizontal periods.

The recording area for the TDM signal includes 4 or 4.5 horizontal periods, counting from the starting end in the head scanning direction, reserved as a recording area for information signals, i.e., a continuous-wave signal for PLL synchronization, a segment synchronizing signal, a reference level signal for AGC, and a ramp signal for linearity correction. The information signal recording area is followed by 135 horizontal periods reserved as a recording area for the TDM signal. The numerals indicated in the TDM signal recording area in FIG. 4 represent the horizontal period numbers, and the letters R, B indicate multiplexed chrominance signals. The TDM signal recording area is followed by a margin of 1.5 or 1 horizontal period.

The HDTV signal is recorded on the magnetic tape according to the above pattern.

In a reproducing mode, the signals recorded on the magnetic tape T are reproduced by the magnetic heads 14AB, 15AB and supplied through the recording/reproducing mode selector switches 13A, 13B to respective playback amplifiers 16A, 16B.

Amplified signals from the playback amplifiers 16A, 16B are supplied to respective frequency demodulators 17A, 17B, which supply demodulated signals to analog signal processors 18A, 18B. The processed signals are supplied from the analog signal processors 18A, 18B through low-pass filters 19A, 19B to respective analog-to-digital (A/D) converters 20A, 20B. The A/D converters 20A, 20B supply converted digital signals to a TDM decoder 21.

The TDM decoder 21 decodes the supplied digital signals into the luminance signal Y and separate chrominance signals PR, PB and interpolates the chrominance signals PR, PB.

The digital luminance signal Y from the TDM decoder 21 is supplied to a D/A converter 22Y which supplies a converted analog luminance signal Y through a low-pass filter 23Y to an output terminal 24Y. The digital chrominance signals PR, PB from the TDM decoder 21 are supplied to D/A converters 22R, 22B which supply converted analog chrominance signals PR, PB through respective low-pass filters 23R, 23B to output terminals 24R, 24B, respectively.

The amplified signals from the playback amplifiers 16A, 16B are also supplied through playback equalizers 25A, 25B respectively to an audio signal playback processor 26. The audio signal playback processor 26 reproduces righthand and lefthand stereophonic audio signals, for example, from the digital audio signals contained in the reproduced signals. The reproduced audio signals are supplied from the audio signal playback processor 26 to output terminals 27L, 27R.

The recorded HTDV signals are reproduced from the magnetic tape in the manner described above.

In the above video tape recorder/reproducer, it has been proposed to effect nonlinear emphasis in the vertical direction of the display screen with a view to improving the image quality of the reproduced signal. Such nonlinear emphasis poses no problem with respect to the luminance signal Y as all horizontal scanning lines are recorded and reproduced for the luminance signal Y. However, a problem arises with the chrominance signals PR, PB out of the fact that they are converted into line sequential signals when recorded and they are interpolated when reproduced.

The drawback caused by nonlinear emphasis on the chrominance signals PR, PB will be described in detail below.

FIG. 5 shows a circuit arrangement for effecting vertical nonlinear emphasis. In FIG. 5, the luminance signal Y is supplied through a vertical nonlinear emphasis circuit 31Y to the TDM encoder 4. The chrominance signals PR, PB are supplied to respective vertical nonlinear emphasis circuits 31R, 31B. The emphasized signals from the vertical nonlinear emphasis circuits 31R, 31B are then supplied to respective vertical low-pass filters 32R, 32B that prevent aliasing distortions that would otherwise be caused by the conversion into line sequential signals. The signals from the low-pass filters 32R, 32B are then supplied to the TDM encoder 4.

The luminance signal Y decoded by the TDM decoder 21 is supplied to the output terminal through a vertical nonlinear deemphasis circuit 33Y. The chrominance signals PR, PB decoded by the TDM decoder 21 are supplied through respective vertical nonlinear deemphasis circuits 33R, 33B to interpolating filters 34R, 34B, respectively, which interpolate the supplied chrominance signals PR, PB in the vertical direction to compensate for the signal omission caused by the line sequential conversion.

The TDM encoder 4 and the TDM decoder 21 shown in FIG. 5 are identical to those shown in FIG. 1.

The vertical low-pass filters 32R, 32B are of a circuit arrangement as shown in FIG. 6A, and the interpolating filters 34R, 34B are of a circuit arrangement as shown in FIG. 6B. Each of the filters shown in FIGS. 6A and 6B includes delay lines 41 for one horizontal line, coefficient circuits 42, and an adder 43.

The vertical nonlinear emphasis circuits 31R, 31B are of a circuit arrangement as shown in FIG. 7A, and the vertical nonlinear deemphasis circuits 33R, 33B are of a circuit arrangement as shown in FIG. 7B. The circuit shown in FIG. 7A includes a delay line 44 for one horizontal line, a subtractor 45, a level adjuster 47, a coefficient circuit 48, and an adder/subtractor 50. The circuit shown in FIG. 7B includes a delay line 44 for one horizontal line, subtractors 45, 46, a level adjuster 47, coefficient circuits 48, 49, and an adder/subtractor 50.

In the vertical nonlinear emphasis circuits 31R, 31B shown in FIG. 7A, the level adjuster 47 has a characteristic curve as shown in FIG. 8A, the coefficient circuit 48 has a coefficient value of 1.5, and the adder/subtractor 50 serves as an adder. In the vertical nonlinear emphasis circuits 33R, 33B shown in FIG. 7B, the level adjuster 47 has a characteristic curve as shown in FIG. 8B, the coefficient circuits 48, 49 have a coefficient value of 0.6, and the adder/subtractor 50 serves as a subtractor.

In the case where the color of an image changes vertically from green to magenta as shown in FIG. 9, the chrominance signal representative of the image varies as shown in FIG. 10A. Small circles in FIGS. 10A through 10C indicate the positions of horizontal scanning lines.

The signals which are omitted in alternate horizontal scanning periods by the line sequential conversion have two phases as shown in FIGS. 10B and 10C. When the signals omitted with the phases shown in FIGS. 10B and 10C were recorded and reproduced using the circuit arrangement of FIG. 5 which includes the emphasis circuits 31R, 31B and the interpolating filters 34R, 34B in a simulating process, the output signals had waveform distortions as indicated by solid lines a in FIGS. 11A and 11B. Input signals had waveforms as indicated by solid lines b, and output signals with no emphasis and deemphasis had waveforms as indicated by solid lines c.

In the circuit arrangement shown in FIG. 5, the emphasis circuits and the deemphasis circuits are combined with the low-pass filters for preventing aliasing distortions and the interpolating filters. These filters lower frequency characteristics of the signals, changing their waveforms. As a result, the deemphasized signals suffer waveform distortions, and their original waveforms cannot be reproduced exactly.

OBJECTS AND SUMMARY OF THE INVENTION

In view of the aforesaid problems of the conventional video tape recorder/reproducer, it is an object of the present invention to provide a video signal processing apparatus having a simple circuit arrangement which is capable of effecting vertical emphasis and deemphasis on chrominance signals.

According to the present invention, there is provided a video signal processing apparatus comprising an encoder for converting a chrominance signal into a line sequential signal, time-compressing the line sequential signal and multiplexing the time-compressed line sequential signal with a luminance signal on time compression according to time-division multiplexing, thereby producing a time-division-multiplexed signal, a vertical emphasis circuit connected to an input terminal of the encoder, for effecting vertical nonlinear emphasis on the chrominance signal, and a vertical low-pass filter for removing aliasing distortions from the chrominance signal due to the conversion of the chrominance signal into the line sequential signal, whereby the vertical nonlinear emphasis is effected on the chrominance signal after the chrominance signal has been processed by the vertical low-pass filter.

Since the vertical nonlinear emphasis is effected on the chrominance signal after it has been processed by the vertical low-pass filter that prevents removes aliasing distortions from the chrominance signal due to the line sequential signal conversion, the signal waveform is prevented from being distorted, and the chrominance signal can be recorded and reproduced by a relatively simple circuit arrangement.

The above and other objects, features, and advantages of the present invention will become apparent from the following description of illustrative embodiments thereof to be read in conjunction with the accompanying drawings, in which like reference numerals represent the same or similar objects.

BRIEF DESCRIPTION OF THE DRAWINGS

FIGS. 2A through 2E are diagrams showing luminance and chrominance signals;

FIG. 3 is a diagram showing a TDM signal;

FIG. 9 is a diagram of a display screen, showing a color change of a displayed image;

FIGS. 10A through 10C are diagrams showing signal waveforms;

DETAILED DESCRIPTION OF THE PREFERRED EMBODIMENTS

Figure 12:
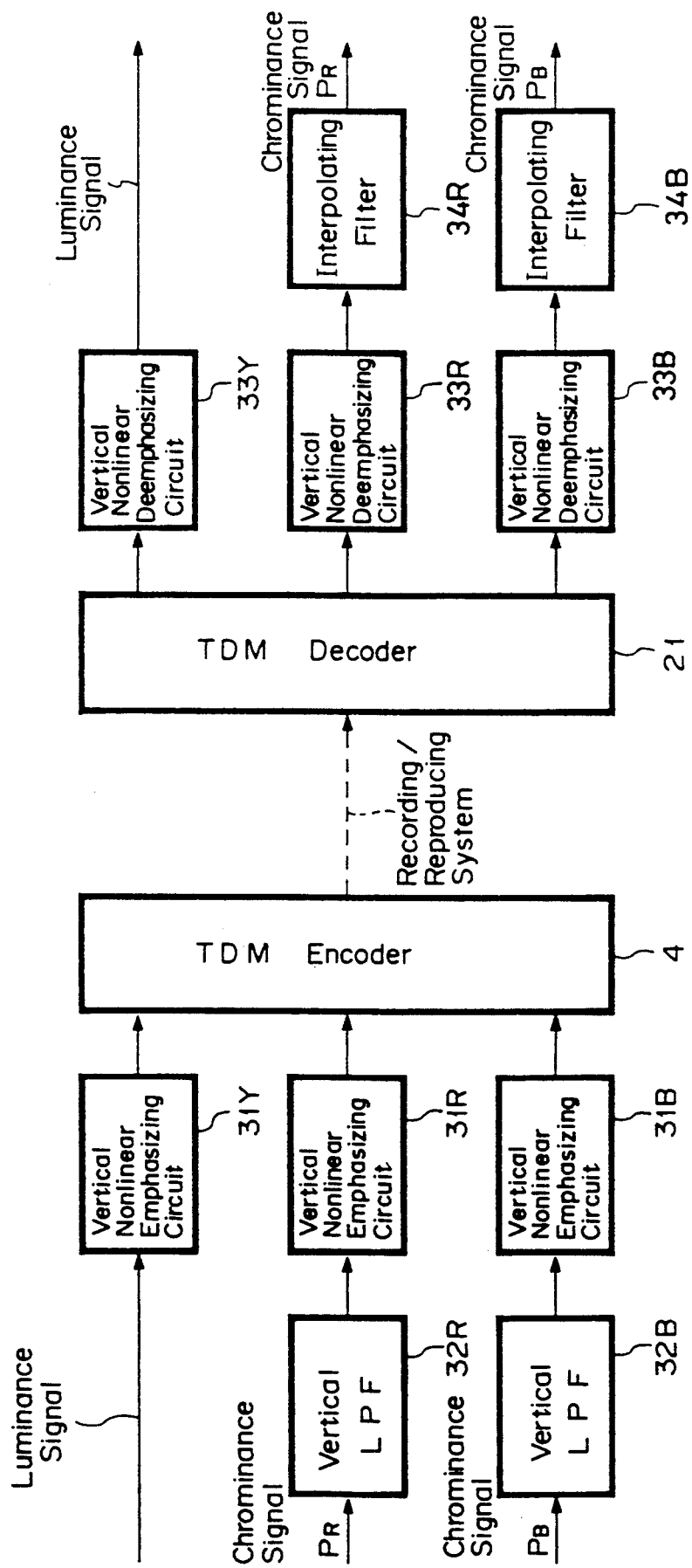
FIG. 12 is a block diagram of a video signal processing apparatus according to the present invention.

FIG. 12 shows a video signal processing apparatus according to the present invention, typically used as a video signal recording/reproducing apparatus in a video tape recorder/reproducer.

As shown in FIG. 12, a luminance signal Y is supplied through a vertical nonlinear emphasis circuit 31Y to a TDM encoder 4. Chrominance signals PR, PB are supplied to respective vertical low-pass filters 32R, 32B that prevent aliasing distortions that would otherwise be caused by the conversion into line sequential signals. The signals that have passed through the low-pass filters 32R, 32B are supplied to respective vertical nonlinear emphasis circuits 31R, 31B. The signals from the vertical nonlinear emphasis circuits 31R, 31B are then supplied to the TDM encoder 4.

The luminance signal Y decoded by a TDM decoder 21 is supplied to an output terminal through a vertical nonlinear deemphasis circuit 33Y. The chrominance signals PR, PB decoded by the TDM decoder 21 are supplied through respective vertical nonlinear deemphasis circuits 33R, 33B to interpolating filters 34R, 34B, respectively, which interpolate the supplied chrominance signals PR, PB in the vertical direction to compensate for the signal omission caused by the line sequential conversion.

Figure 1A:
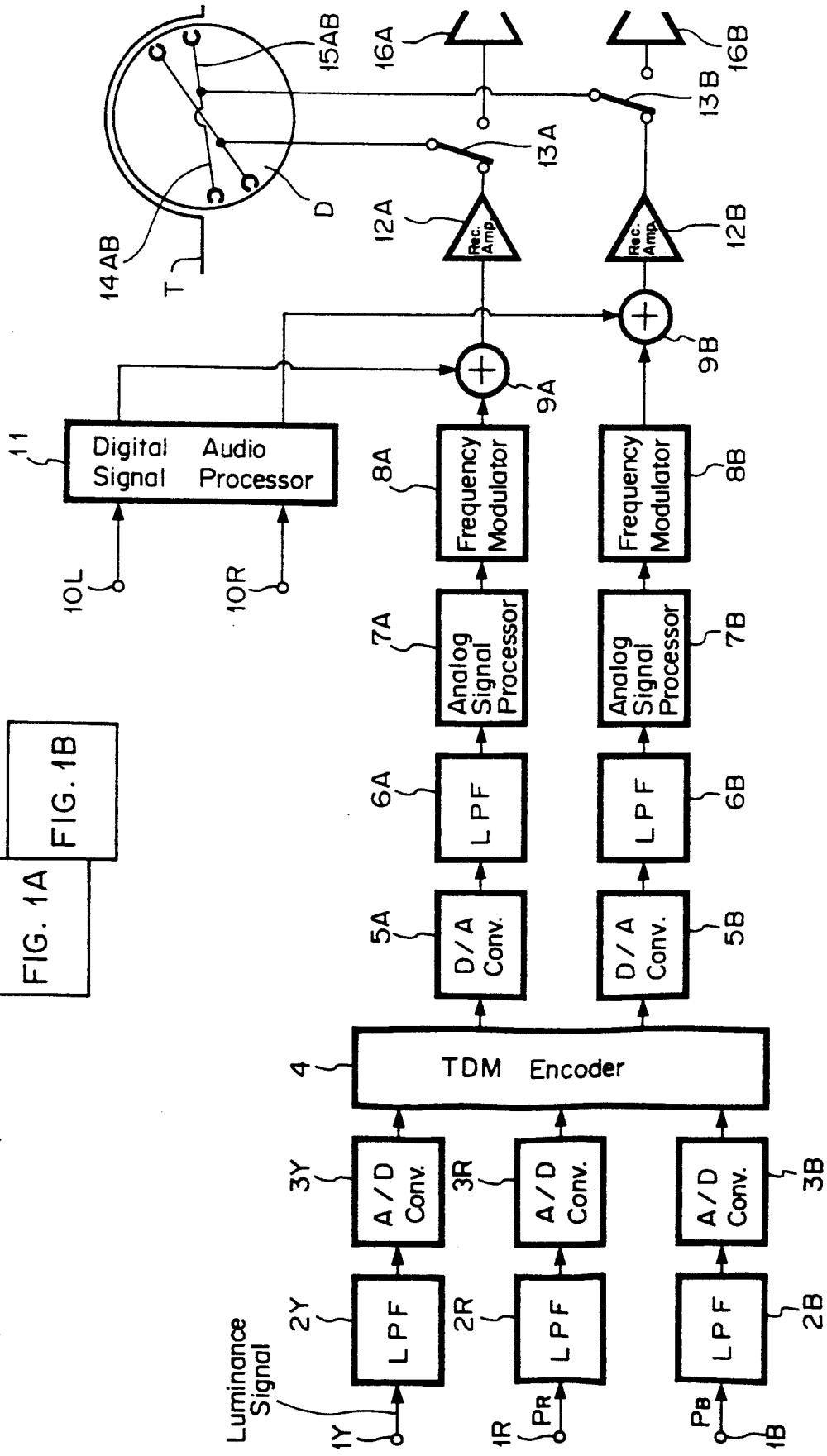
FIG. 1 is a block diagram of a video tape recorder/reproducer.
Figure 1B:
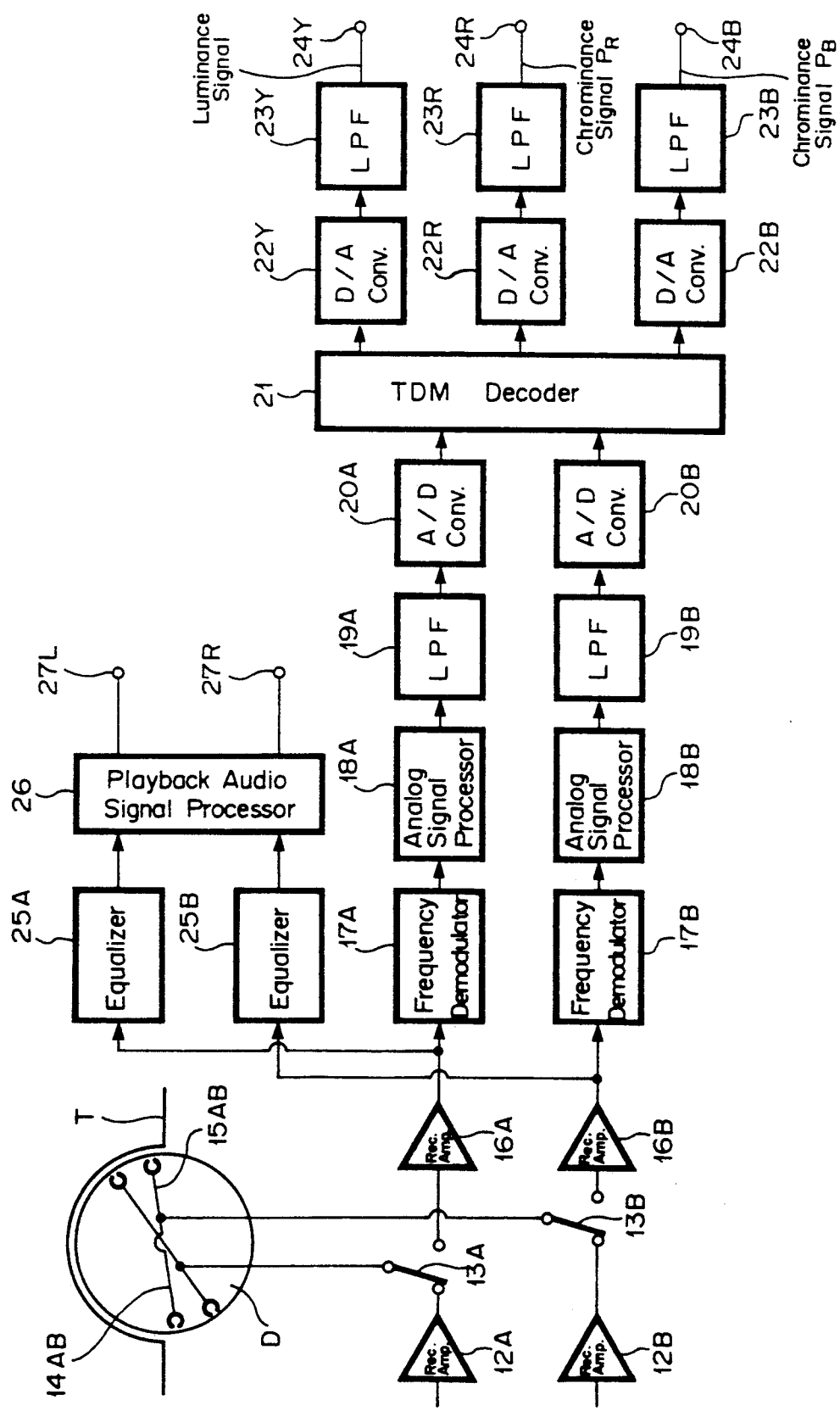
Figure 4A:
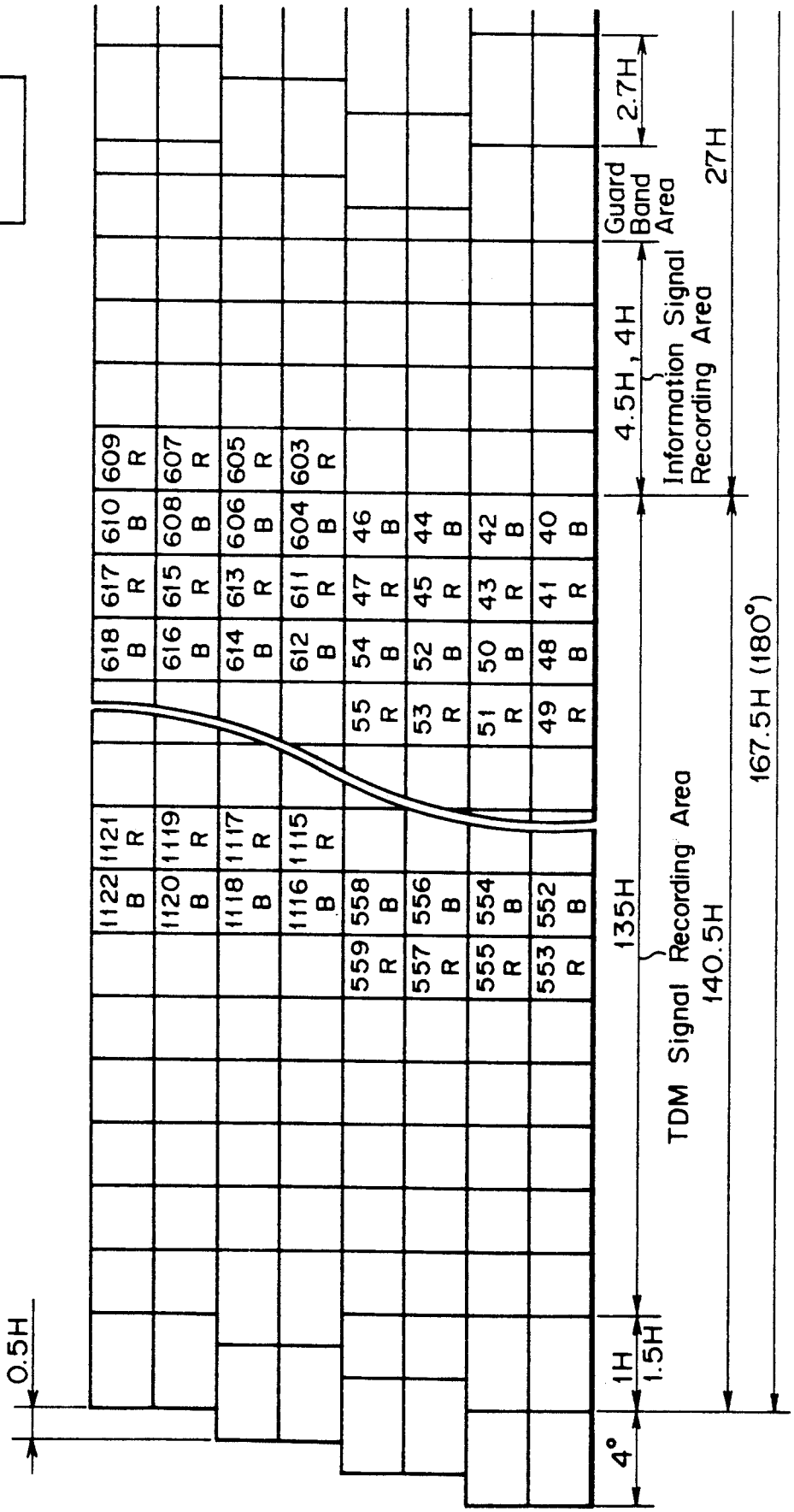
FIG. 4 is a diagram illustrative of a recording pattern.
Figure 4B:
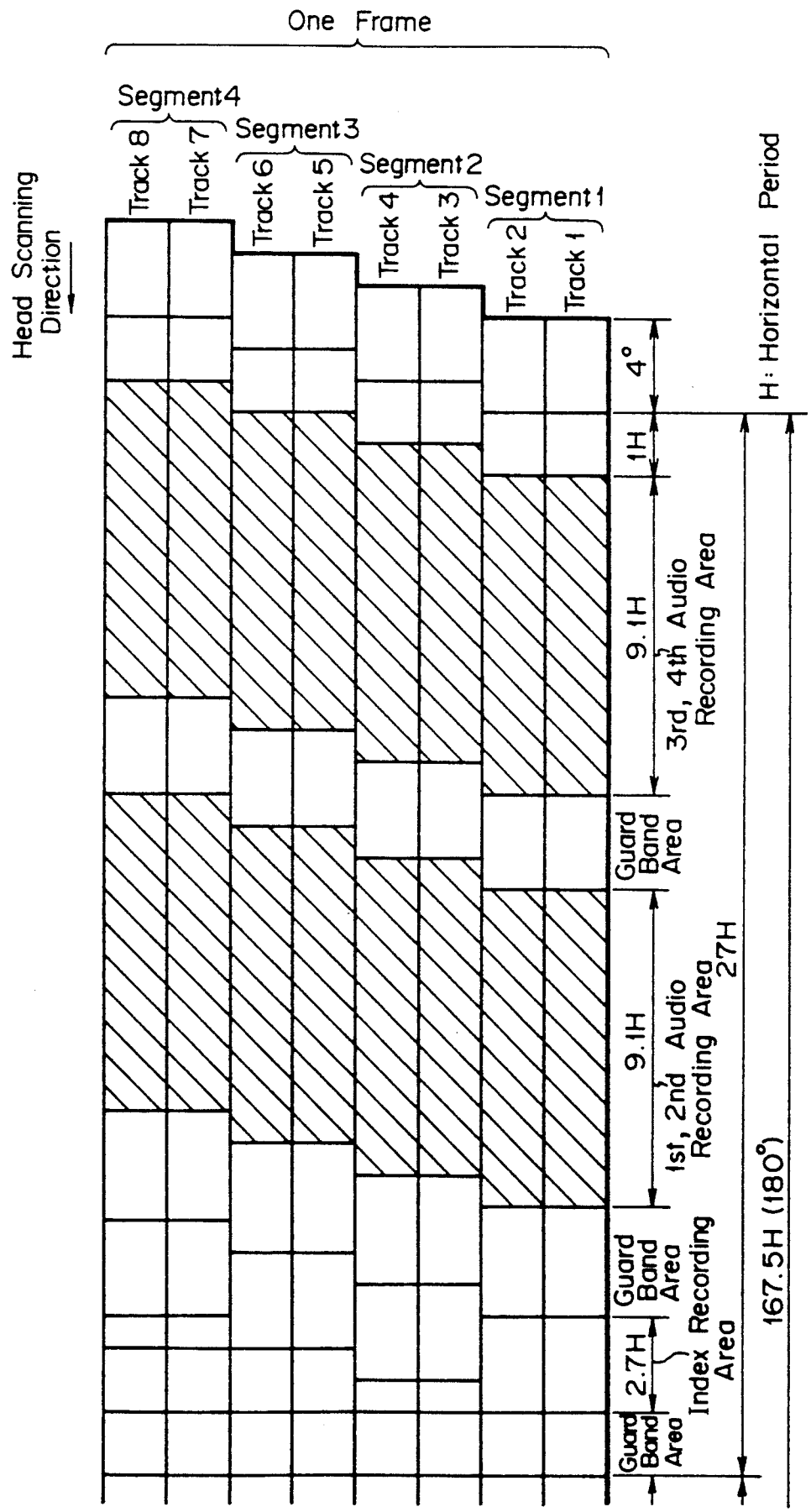
Figure 5:
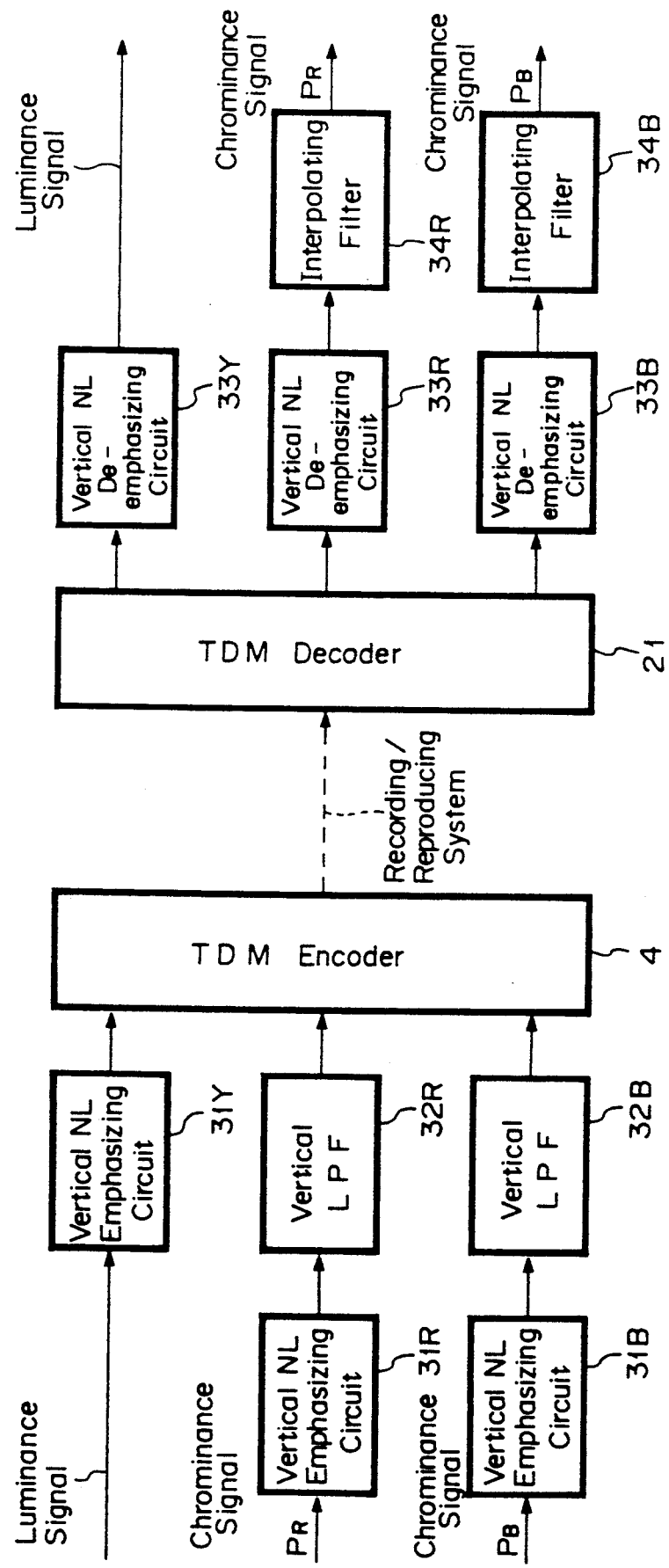
FIG. 5 is a block diagram of a conventional video signal processing apparatus for effecting vertical nonlinear emphasis.

The TDM encoder 4 and the TDM decoder 21 shown in FIG. 12 are identical to those shown in FIGS. 1 and 5.

Figure 13A:
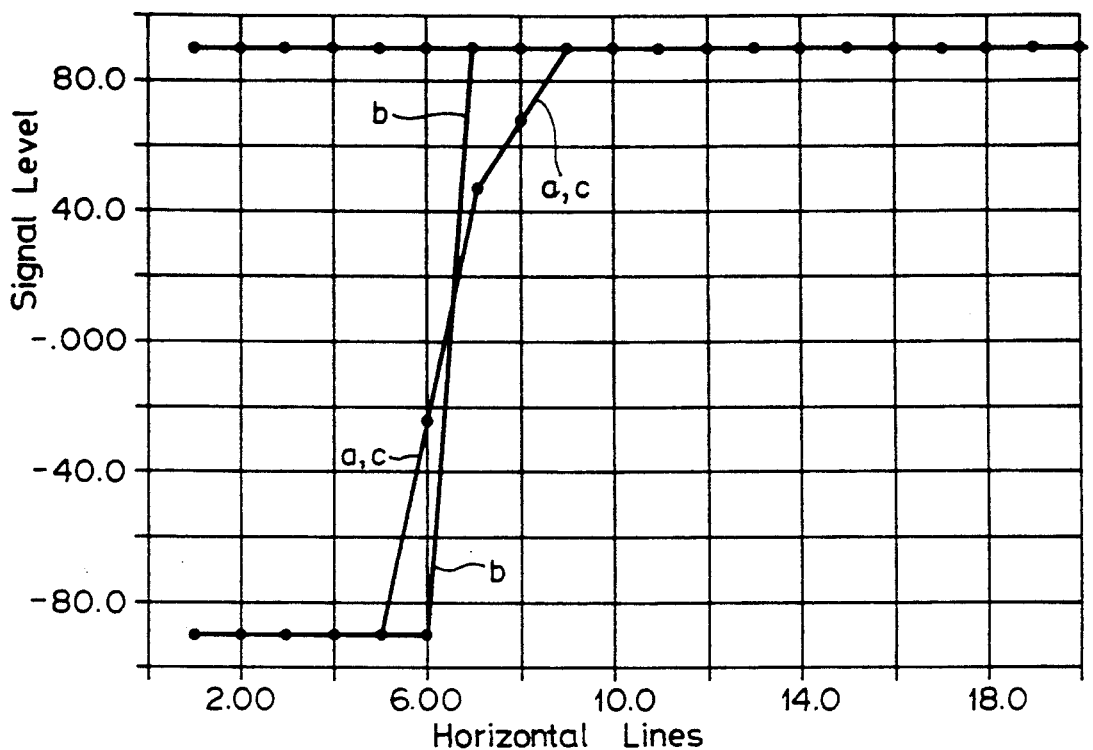
FIGS. 13A and 13B are diagrams showing characteristic curves of signals produced by the video signal processing apparatus shown in FIG. 12.
Figure 13B:
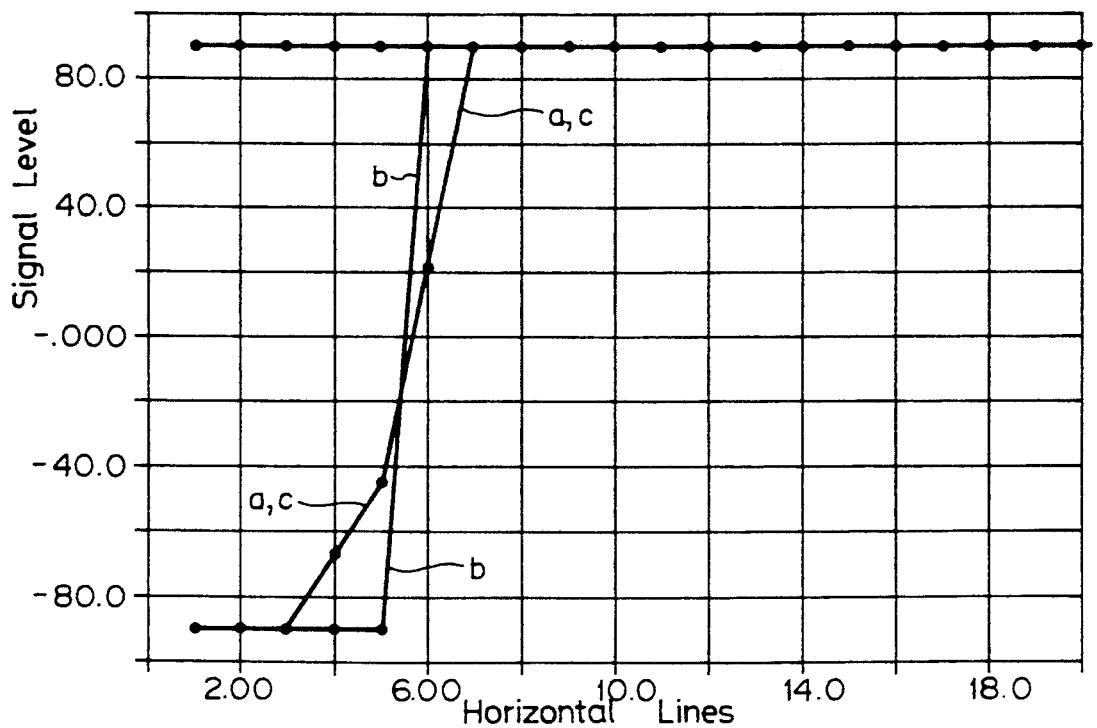

When the signals with two phases were recorded and reproduced using the circuit arrangement of FIG. 12 in a simulating process, the output signals had waveforms as indicated by solid lines a in FIGS. 13A and 13B, these output signal waveforms being identical to those of output signals with no emphasis and deemphasis as indicated by solid lines c. Input signals had waveforms as indicated by the solid lines b.

In the conventional circuit arrangement, the chrominance signals are limited in bandwidth by the low-pass filters after they have been subjected to vertical emphasis. This signal processing causes large waveform distortions as some signal components are lost after being emphasized. According to the circuit arrangement shown in FIG. 12, however, the signals are limited in bandwidth by the low-pass filters before they are subjected to vertical emphasis, so that the signal waveforms will not be varied by the emphasizing and deemphasizing processes.

Figure 6A:
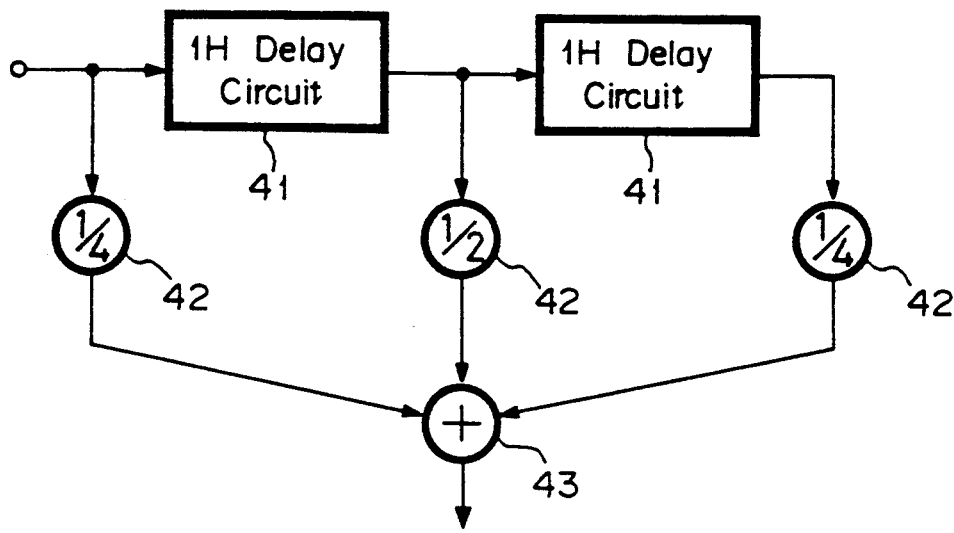
FIGS. 6A and 6B are block diagrams of filters in the video signal processing apparatus shown in FIG. 5.
Figure 6B:
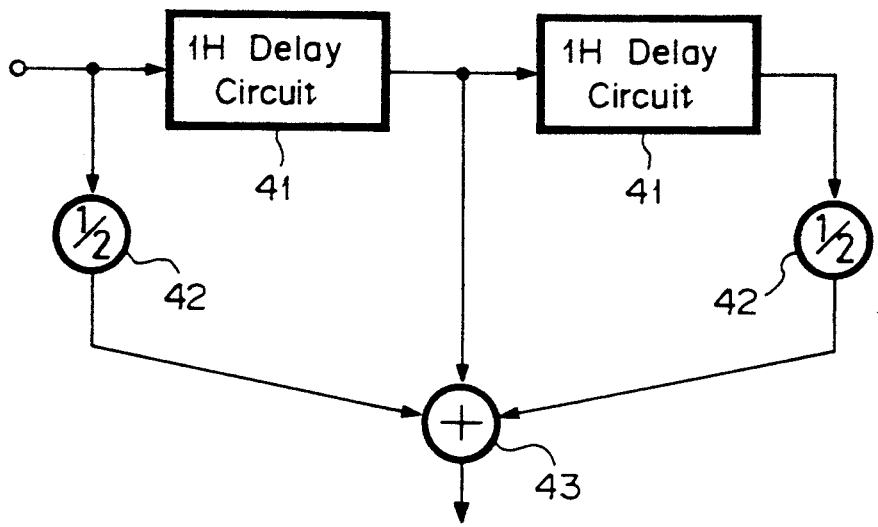
Figure 7A:
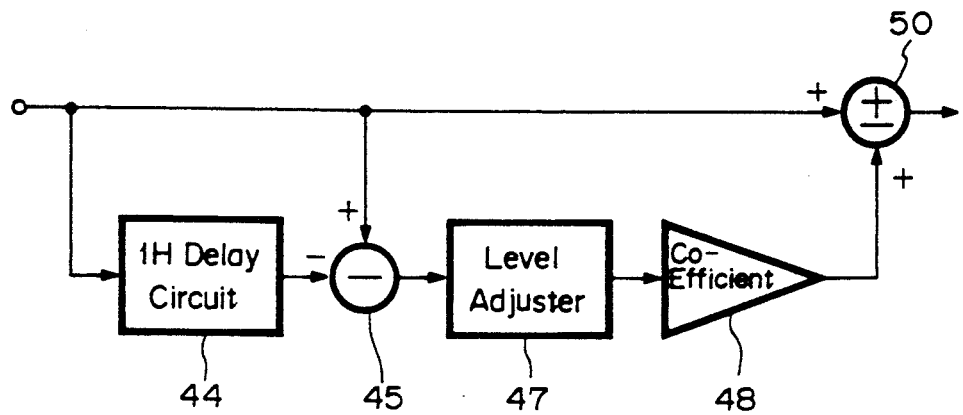
FIGS. 7A and 7B are block diagrams of emphasis and deemphasis circuits in the video signal processing apparatus shown in FIG. 5.
Figure 7B:
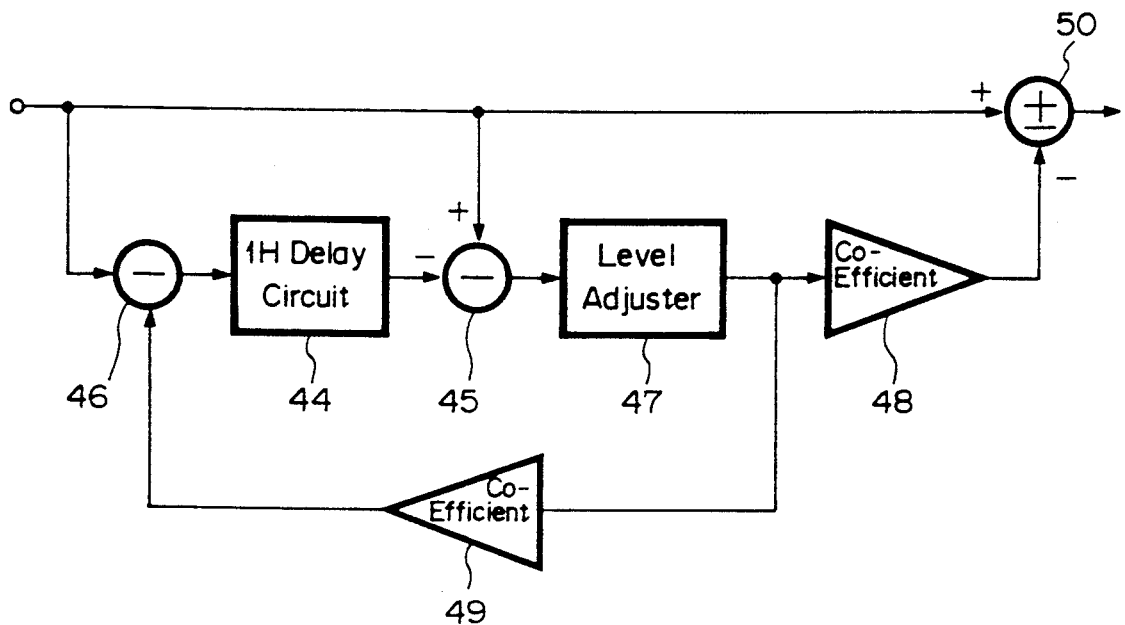
Figure 8A:
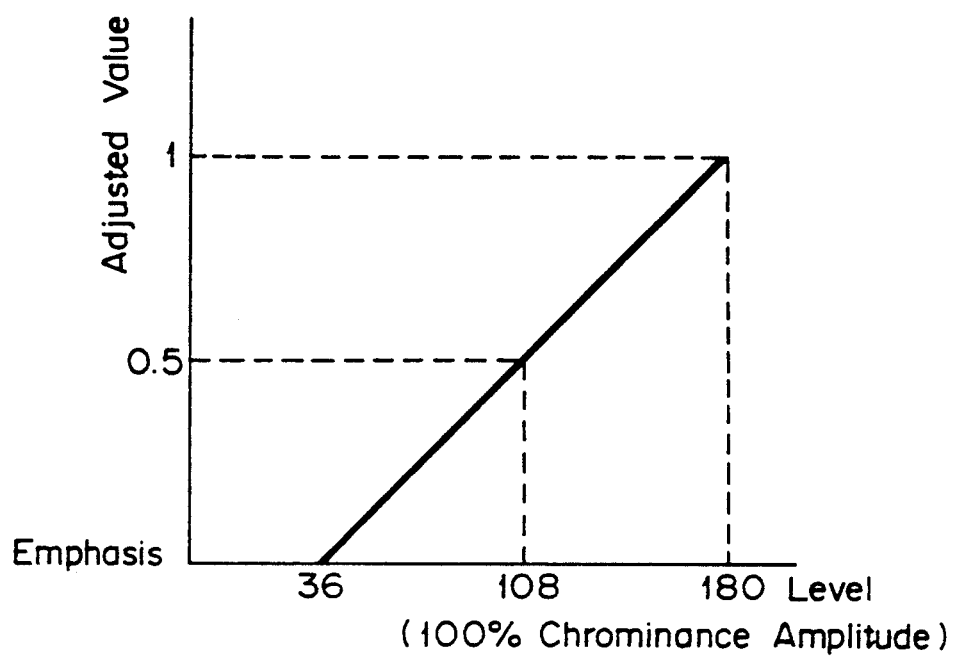
FIGS. 8A and 8B are diagrams showing characteristic curves of level adjusters in the emphasis and deemphasis circuits shown in FIGS. 7A and 7B.
Figure 8B:
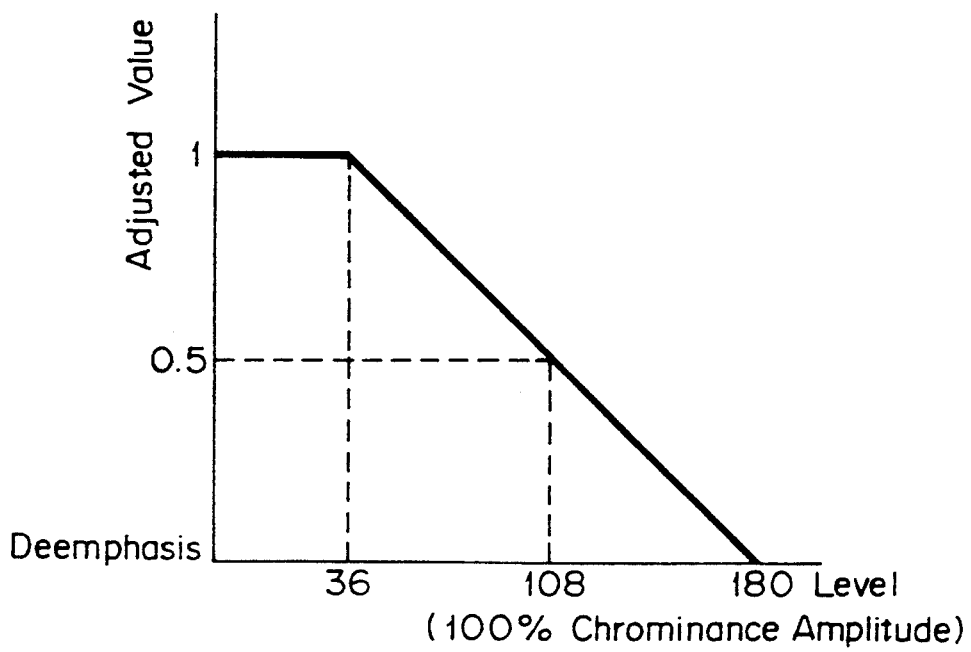
Figure 11A:
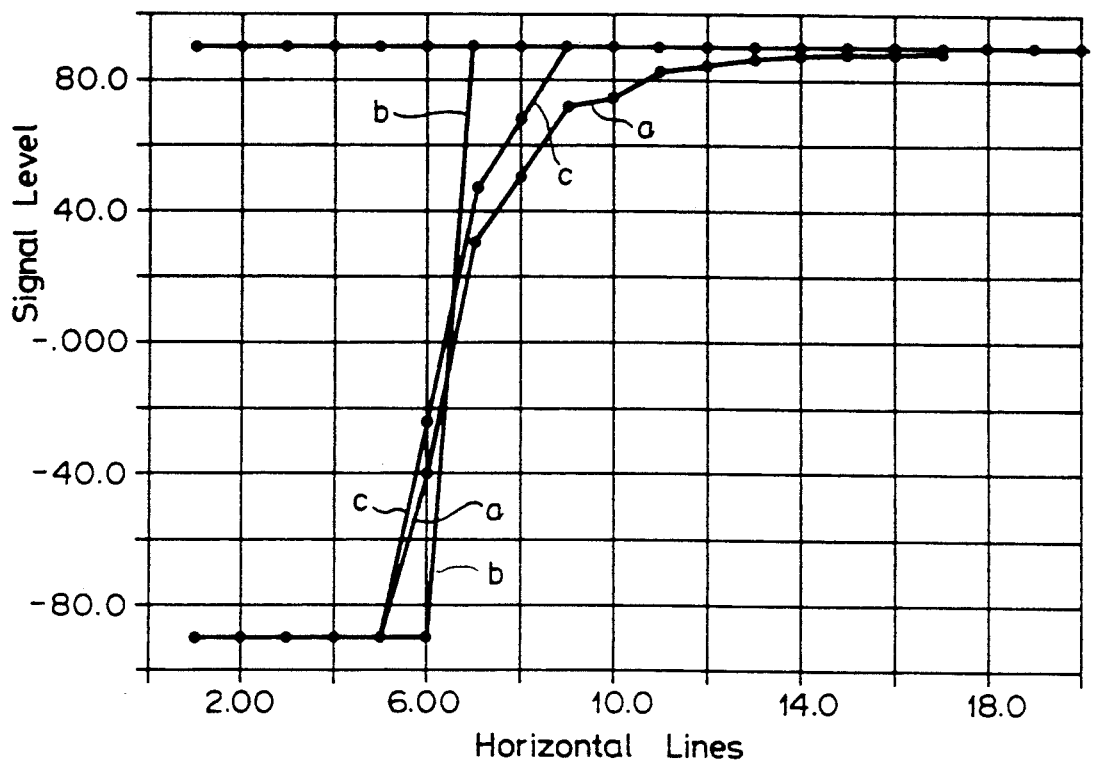
FIGS. 11A and 11B are diagrams of characteristic curves showing waveform distortions.
Figure 11B:
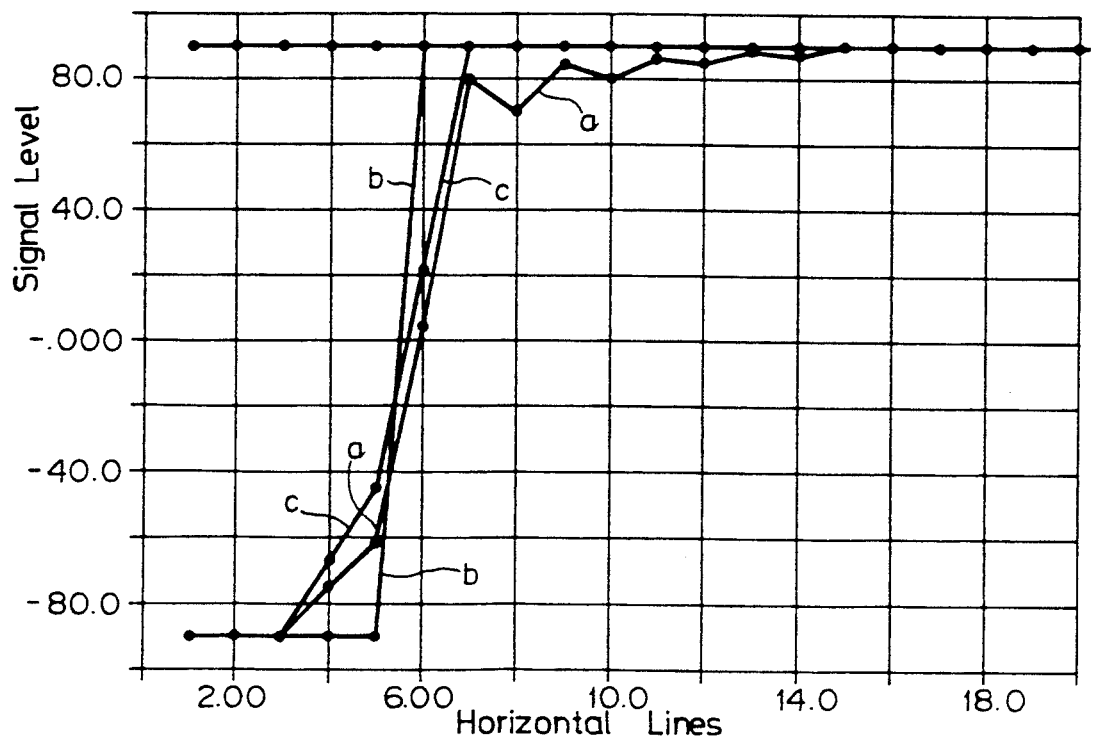

In the above simulating process, each of the low-pass filters 32R, 32B and the interpolating filters 34R, 34B is in the form of a 3-tap circuit as shown in FIGS. 6A and 6B. If these filters comprise ideal circuits, then the input signal waveforms b and the output signal waveforms a may be brought into conformity with each other.

With the circuit arrangement shown in FIG. 12, the vertical nonlinear emphasis circuits 31R, 31B for nonlinearly emphasizing the chrominance signals PR, PB are connected to perform vertical nonlinear emphasis on the chrominance signals PR, PB after they have been processed by the vertical low-pass filters 32R, 32B that prevent aliasing distortions that would otherwise be caused by the conversion into line sequential signals. Therefore, the signal waveforms are prevented from being distorted, and the signals can be recorded and reproduced with good characteristics by a circuit arrangement which is relatively simple.

Figure 14:
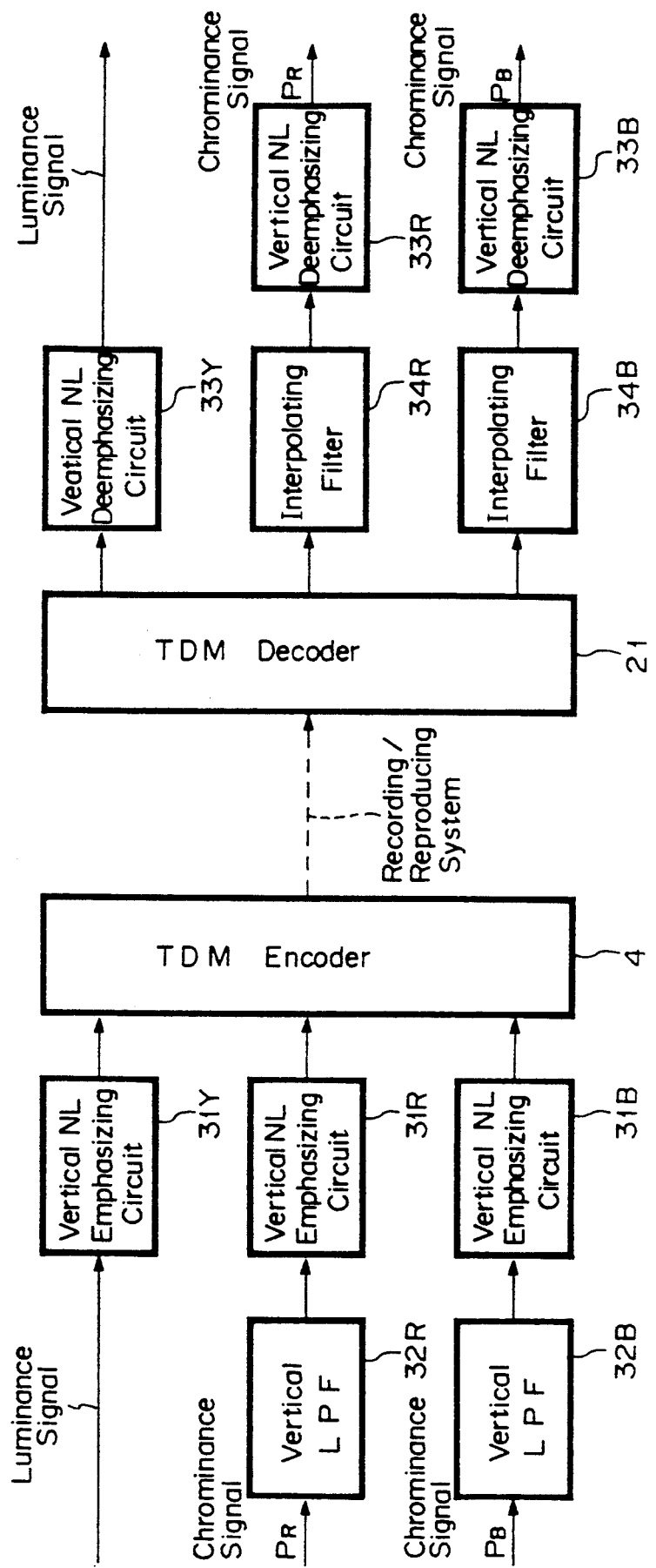
FIG. 14 is a block diagram of a video signal processing apparatus according to another embodiment of the present invention.

FIG. 14 shows a video signal processing apparatus according to another embodiment of the present invention. The video signal processing apparatus shown in FIG. 14 differs from video signal processing apparatus shown in FIG. 12 in that the chrominance signals PR, PB decoded by the TDM decoder 21 are first supplied to the interpolating filters 34R, 34B by which they are interpolated in the vertical direction, and the interpolated chrominance signals PR, PB are supplied to the vertical nonlinear deemphasis circuits 33R, 33B.

Figure 15A:
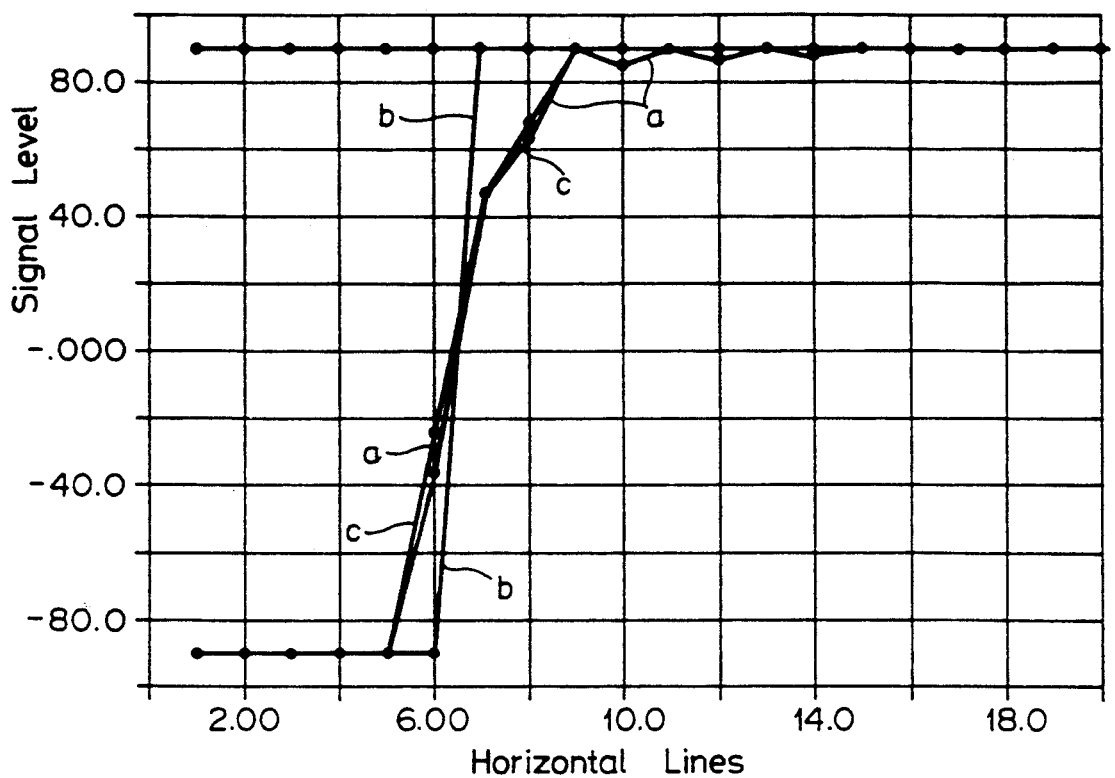
FIGS. 15A and 15B are diagrams showing characteristic curves of signals produced by the video signal processing apparatus shown in FIG. 14.
Figure 15B:
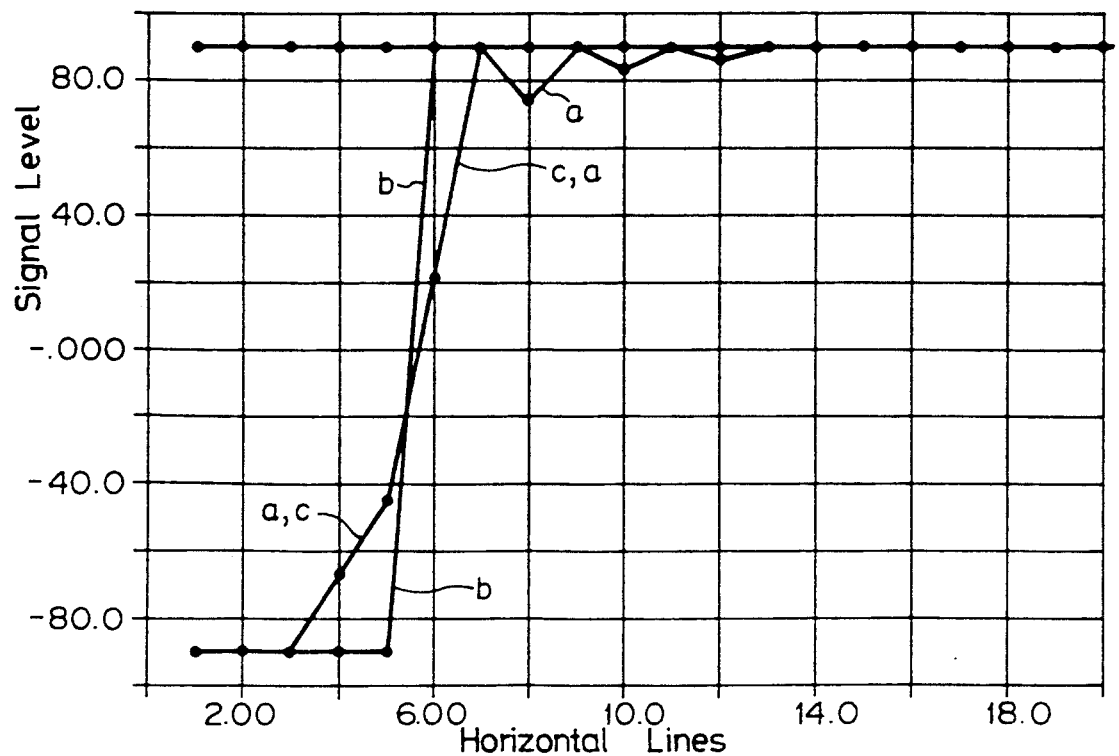

The signals recorded and reproduced using the circuit arrangement shown in FIG. 14 in a simulating process had waveforms as shown in FIGS. 15A and 15B. With the interpolating filters 34R, 34B comprising ideal circuits, the output signal waveforms a can be identical to the output signal waveforms c with no emphasis and deemphasis effected.

Figure 16:
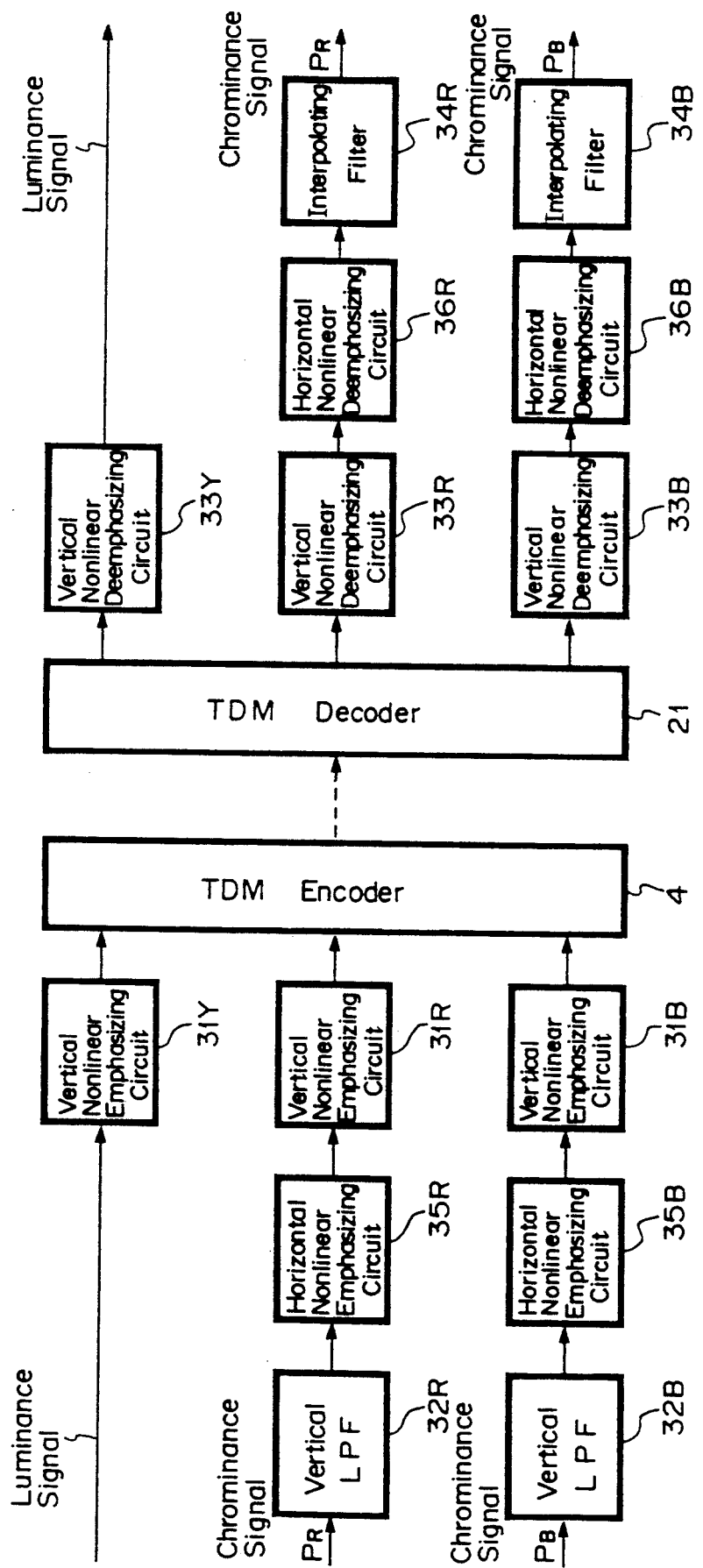
FIG. 16 is a block diagram of a video signal processing apparatus according to still another embodiment of the present invention.

FIG. 16 shows a video signal processing apparatus according to still another embodiment of the present invention, the video signal processing apparatus including circuits for effecting horizontal nonlinear emphasis and deemphasis.

As shown in FIG. 16, horizontal nonlinear emphasis circuits 35R, 35B are connected between the vertical low-pass filters 32R, 32B and the vertical nonlinear emphasis circuits 31R, 31B, and horizontal nonlinear deemphasis circuits 36R, 36B are connected between the vertical nonlinear deemphasis circuits 33R, 33B and the interpolating filters 34R, 34B. The horizontal nonlinear emphasis circuits 35R, 35B may be connected to input terminals of the vertical low-pass filters 32R, 32B, but should not be connected to output terminals of the vertical nonlinear emphasis circuits 31R, 31B. The horizontal nonlinear deemphasis circuits 36R, 36B may be connected to output terminals of the interpolating filters 34R, 34B, but should not be connected to input terminals of the vertical nonlinear deemphasis circuits 33R, 33B.

The present invention may be applied to not only video tape recorder/reproducers for illustrated HDTV signals, but also video tape recorder/reproducers for other HDTV signals and conventional television video signals.

The principles of the present invention are applicable to the processing of analog signals as well as digital signals.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A video signal processing apparatus comprising:
    a vertical low-pass filter for filtering a chrominance signal to suppress aliasing distortions upon subsequent conversion of said chrominance signal into a line sequential signal;
    a vertical emphasis circuit for receiving a filtered chrominance signal output from said vertical low-pass filter and performing vertical nonlinear emphasis on said filtered chrominance signal; and
    an encoder for receiving an emphasized chrominance signal output from said vertical emphasis circuit, converting said emphasized chrominance signal into said line sequential signal and combining said line sequential signal with a luminance signal by time-division multiplexing to produce a time-division-multiplexed signal.

2. A video signal processing apparatus according to claim 1, further including:
    a decoder for decoding said time-division-multiplexed signal into a chrominance signal and a luminance signal;
    a vertical deemphasis circuit for performing vertical nonlinear deemphasis on a chrominance signal output from said decoder; and
    an interpolating filter for receiving and interpolating a deemphasized chrominance signal output from said vertical deemphasis circuit.

3. A video signal processing apparatus according to claim 1, further including:
    a decoder for decoding said time-division-multiplexed signal into a chrominance signal and a luminance signal;
    an interpolating filter for receiving and interpolating a chrominance signal output from said decoder; and
    a vertical deemphasis circuit connected to an output of said interpolating filter for performing nonlinear deemphasis on said chrominance signal interpolated by said interpolating filter.

4. A video signal processing apparatus according to claim 1, for use as a video tape recorder/reproducer.

5. A video signal processing apparatus according to claim 4, wherein said video tape recorder/reproducer comprises means for processing high-definition television signals.

6. A video signal processing apparatus comprising:
a vertical low-pass filter for filtering a chrominance signal to suppress aliasing distortions upon subsequent conversion of said chrominance signal into a line sequential signal;
a horizontal emphasis circuit for receiving a filtered chrominance signal output from said vertical low-pass filter and performing horizontal emphasis on said filtered chrominance signal;
a vertical emphasis circuit having an input terminal connected to said horizontal emphasis circuit for performing vertical nonlinear emphasis on said chrominance signal that was horizontally emphasized by said horizontal emphasis circuit; and
an encoder for receiving an emphasized chrominance signal output from said vertical emphasis circuit, converting said emphasized chrominance signal into said line sequential signal and combining said line sequential signal with a luminance signal by time-division multiplexing to produce a time-division-multiplexed signal.

7. A video signal processing apparatus according to claim 6, further including:
a decoder for decoding said time-division-multiplexed signal into a chrominance signal and a luminance signal;
a vertical deemphasis circuit for performing vertical nonlinear deemphasis on a chrominance signal output from said decoder;
a horizontal deemphasis circuit connected to an output terminal of said vertical deemphasis circuit for performing horizontal deemphasis on a vertically deemphasized chrominance signal output from said vertical deemphasis circuit; and
an interpolating filter for receiving and interpolating a horizontally deemphasized chrominance signal output from said horizontal deemphasis circuit.

8. A video signal processing apparatus according to claim 6, further including:
a decoder for decoding said time-division-multiplexed signal into a chrominance signal and a luminance signal;
a vertical deemphasis circuit for performing vertical nonlinear deemphasis on a chrominance signal output from said decoder;
an interpolating filter for receiving and interpolating a deemphasized chrominance signal output from said vertical deemphasis circuit; and
a horizontal deemphasis circuit connected to an output terminal of said interpolating filter for performing horizontal deemphasis on said chrominance signal interpolated by said interpolating filter.

* * * * *